United States Patent
Alazazmeh et al.

(10) Patent No.: US 9,835,342 B2
(45) Date of Patent: Dec. 5, 2017

(54) EVAPORATIVE CONDENSER COOLING SYSTEM

(71) Applicant: KING FAHD UNIVERSITY OF PETROLEUM AND MINERALS, Dhahran (SA)

(72) Inventors: Ayman Jamal Abdel Majid Alazazmeh, Dammam (SA); Esmail Mohamed Ali Mokheimer, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 143 days.

(21) Appl. No.: 15/077,804

(22) Filed: Mar. 22, 2016

(65) Prior Publication Data

US 2017/0276382 A1   Sep. 28, 2017

(51) Int. Cl.
| | |
|---|---|
| *F24F 5/00* | (2006.01) |
| *F25B 39/00* | (2006.01) |
| *F25B 7/00* | (2006.01) |
| *F25B 19/00* | (2006.01) |
| *F24F 13/22* | (2006.01) |

(52) U.S. Cl.
CPC ............ *F24F 5/001* (2013.01); *F24F 5/0035* (2013.01); *F24F 13/22* (2013.01); *F25B 7/00* (2013.01); *F25B 19/00* (2013.01); *F25B 39/00* (2013.01); *F25B 2339/041* (2013.01); *F25B 2339/047* (2013.01)

(58) Field of Classification Search
CPC .......... F24F 5/001; F24F 13/22; F24F 5/0035; F25B 7/00; F25B 39/00; F25B 19/00; F25B 2339/041; F25B 2339/047

USPC .................................................. 62/140, 305
See application file for complete search history.

(56) References Cited

U.S. PATENT DOCUMENTS

| | | | | |
|---|---|---|---|---|
| 2,246,999 | A * | 6/1941 | Morrison ................ | F24F 1/022 62/406 |
| 2,995,018 | A * | 8/1961 | Dempsey, Jr. .......... | F25B 39/04 62/305 |
| 3,034,315 | A |  5/1962 | Coblentz | |
| 5,046,331 | A * | 9/1991 | O'Neal ................. | F24F 5/0035 165/163 |

(Continued)

FOREIGN PATENT DOCUMENTS

| | | |
|---|---|---|
| CN | 201429259 Y | 3/2010 |
| JP | 2010-266180 A | 11/2010 |

*Primary Examiner* — Emmanuel Duke
(74) *Attorney, Agent, or Firm* — Oblon, McClelland, Maier & Neustadt, L.L.P.

(57) ABSTRACT

The evaporative condenser cooling system is an air cooling system combining an evaporative condenser and a sensible heat exchanger. The evaporative condenser cools environmental air in a conventional manner, and includes a condenser immersed in water contained within a water reservoir. The water in the reservoir is also used to humidify another portion of environmental air, which is, in turn, cooled by evaporative cooling, and this cooled air is used in a heat exchange process with the sensible heat exchanger. The sensible heat exchanger is in communication with the water reservoir to provide additional cooling to the water therein, which is used to provide a further cooled environment for the condenser, enhancing heat exchange between the condenser and the water in which it is immersed.

9 Claims, 1 Drawing Sheet

(56) References Cited

U.S. PATENT DOCUMENTS

| | | | |
|---|---|---|---|
| 6,651,455 B1 * | 11/2003 | Yoho, Sr. | F25B 39/04 |
| | | | 62/305 |
| 2003/0159458 A1 * | 8/2003 | Fang | F25B 6/04 |
| | | | 62/305 |
| 2009/0200000 A1 | 8/2009 | Kammerzell | |
| 2011/0100593 A1 | 5/2011 | Benz et al. | |
| 2011/0139403 A1 | 6/2011 | Urch | |
| 2014/0264974 A1 | 9/2014 | Aaron et al. | |

\* cited by examiner

EVAPORATIVE CONDENSER COOLING SYSTEM

BACKGROUND OF THE INVENTION

1. Field of the Invention

The present invention relates to cooling systems, such as air conditioners, chillers and the like, and particularly to an evaporative condenser cooling system for heating/ventilation/air conditioning (HVAC) systems.

2. Description of the Related Art

A conventional refrigerant cooling system of the type used in air conditioners, refrigerators, chillers and the like, typically includes a condenser, a compressor and an evaporator, each in fluid communication with one another. In the conventional refrigeration or cooling cycle, a phase-change fluid is used as a refrigerant. The refrigerant in a gaseous phase is output from the evaporator, and is then compressed to pressurized refrigerant by the compressor. The pressurized refrigerant is then input to the condenser for condensation thereof into liquid refrigerant. The liquid refrigerant is then input back into the evaporator, where it evaporates, producing the gaseous refrigerant. The condenser provides heat exchange such that thermal energy is transferred from the refrigerant fluid into the environment, thus lowering the refrigerant below its condensation point in the condenser. In the evaporator, environmental air transfers thermal energy into the refrigerant, and this heat exchange yields the cooled air product.

A typical condenser found in a household refrigerator, small air conditioning unit or the like is air-cooled. Since such a system is typically used in an environment that is at room temperature or hotter, this air cooling of the condenser is relatively inefficient, as the temperature gradient between the refrigerant and the external cooling environment is minimal. Thus, an evaporative condenser cooling system solving the aforementioned problems is desired.

SUMMARY OF THE INVENTION

The evaporative condenser cooling system is an air cooling system combining an evaporative condenser with a sensible heat exchanger. The evaporative condenser cooling system includes a housing having an upper portion, a lower portion and a central portion. An upper vent is formed through the upper portion and a lower vent is formed through the lower portion. At least one air inlet is formed through the housing for receiving environmental air. A first portion of the environmental air passes into the upper portion of the housing, and a second portion of the environmental air passes into the lower portion of the housing.

A water reservoir is disposed within the central portion of the housing for storing a volume of water. A sprayer is mounted in the upper portion of the housing. An evaporator pad is also mounted in the upper portion of the housing, the sprayer preferably being embedded therein. The sprayer is in communication with the water reservoir for spraying water into the evaporator pad to dampen the pad. The first portion of the environmental air is drawn through the evaporator pad to produce a first cooled air stream by evaporative cooling. A drain pan is positioned beneath the sprayer for collecting excess water sprayed therefrom, and the drain pan is preferably in fluid communication with the water reservoir for recycling of the excess water. The sprayer may additionally spray atomized water into the first portion of the environmental air prior to passing through the evaporation pad for additional cooling thereof.

A sensible heat exchanger is mounted in the upper portion of the housing above the evaporator pad. The sensible heat exchanger is in communication with the water reservoir for receiving water therefrom. The water received by, and which passes through, the sensible heat exchanger is cooled by the first cooled air stream, via heat exchange therewith, to cool the volume of water in the water reservoir. A condenser fan is mounted on the housing adjacent to the upper vent. The condenser fan draws the first portion of the environmental air through the evaporator pad, as well as drawing the first cooled air stream across the sensible heat exchanger, producing a heated exhaust stream, which is then further drawn out of the housing through the upper vent.

A condenser is disposed within the water reservoir, and a compressor is disposed within the lower portion of the housing. An evaporator is also disposed within the lower portion of the housing. The compressor is in fluid communication with the condenser and the evaporator. The condenser, compressor and evaporator are each in fluid communication with one another, forming a conventional evaporator-condenser cooling cycle, but with the condenser being immersed in the water reservoir. An additional expansion valve may also be connected between the output of the condenser and the input of the evaporator, as is conventionally known.

As in a conventional refrigeration or cooling cycle, gaseous refrigerant is output from the evaporator, and is then compressed to pressurized refrigerant by the compressor. The pressurized refrigerant is then input to the condenser for condensation thereof into liquid refrigerant. The liquid refrigerant is then input back into the evaporator, where it evaporates, producing the gaseous refrigerant. In the present system, the cooling and condensation of the refrigerant in the condenser is enhanced by the cool water contained within the water reservoir, which is produced by the sensible heat exchanger.

Heat exchange between the evaporator and the second portion of the environmental air produces the gaseous refrigerant that is output from the evaporator and further cools the second portion of the environmental air to produce a second cooled air stream. The second cooled air stream exits the lower portion of the housing through the lower vent formed therethrough, and this second cooled air stream is the desired cooled air product. An evaporator fan is mounted in the lower portion of the housing adjacent the lower vent for driving the second portion of the environmental air across the evaporator for heat exchange therewith, and for further driving the second cooled air stream through the lower vent.

These and other features of the present invention will become readily apparent upon further review of the following specification.

DETAILED DESCRIPTION OF THE PREFERRED EMBODIMENTS

Figure 1:
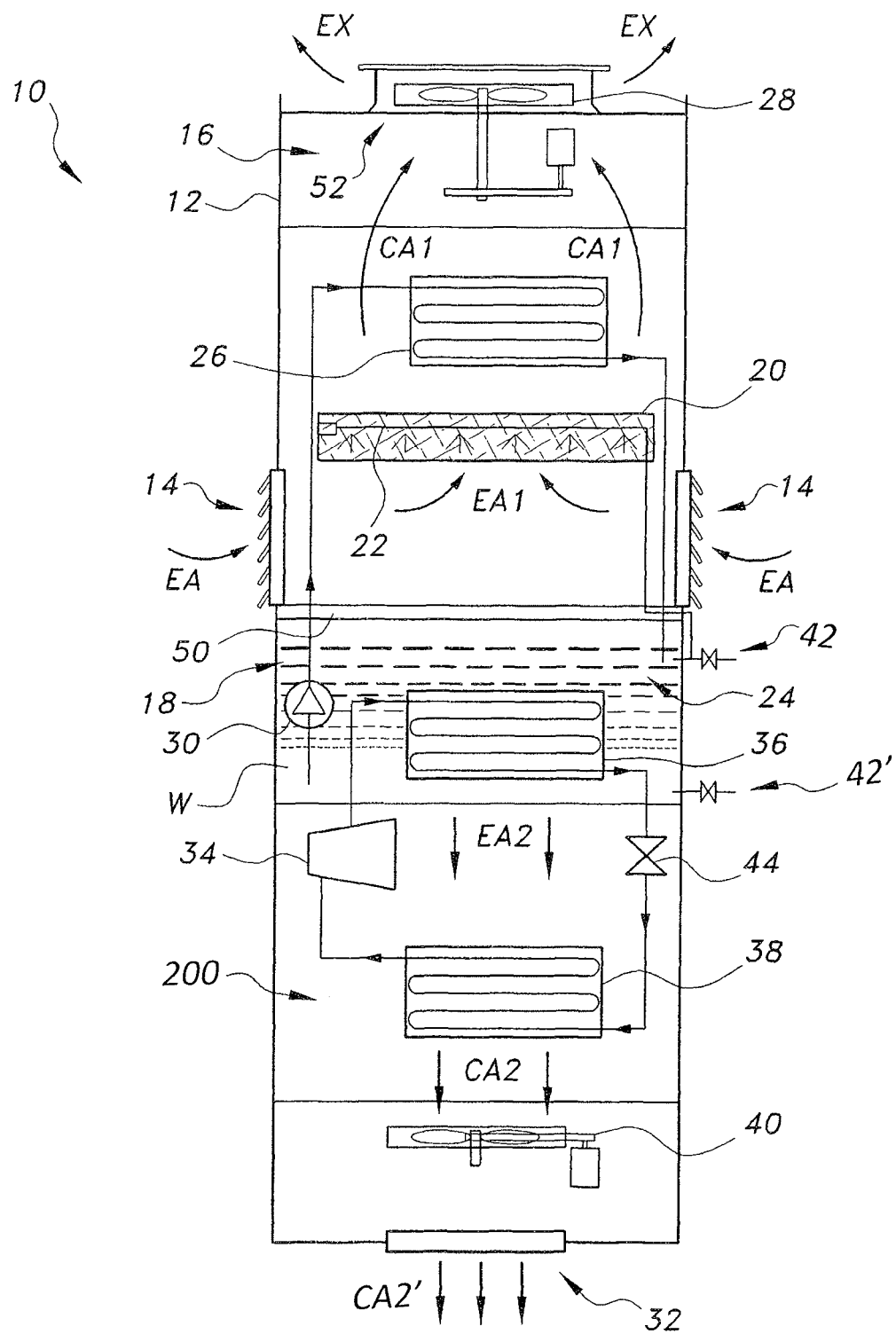
FIG. 1 is a schematic diagram of an evaporative condenser cooling system according to the present invention.

The evaporative condenser cooling system 10 is an air cooling system combining an evaporative condenser and a sensible heat exchanger. The evaporative condenser cooling system includes a housing 12 having an upper portion 16, a lower portion 200 and a central portion 18. It should be understood that the overall configuration and relative dimensions of housing 12, the upper portion 16, the lower portion 200 and the central portion 18 are shown in FIG. 1 for illustrative purposes only. An upper vent 52 is formed through the upper portion 16 and a lower vent 32 is formed through the lower portion 200. At least one air inlet 14 is formed through the housing 12 for receiving environmental air EA. A first portion of the environmental air EA1 passes into the upper portion 16 of the housing 12, and a second portion of the environmental air EA2 passes into the lower portion 200 of the housing 12.

A water reservoir 24 is disposed within the central portion 18 of the housing 12 for storing a volume of water W. A sprayer 22 is mounted in the upper portion 16 of the housing 12. An evaporator pad 20 is also mounted in the upper portion 16 of the housing 12, the sprayer 22 preferably being embedded therein. The sprayer 22 is in communication with the water reservoir 24 for spraying water into the evaporator pad 20 to dampen the pad 20. It should be understood that any suitable type of sprayer may be utilized for producing an atomized spray of water to dampen the evaporator pad 20. Alternatively, the sprayer 22 may be positioned adjacent to the evaporator pad 20, rather than being embedded therein.

The first portion of the environmental air EA1 is drawn through the evaporator pad 20 to produce a first cooled air stream CA1 by evaporative cooling. It should be understood that any suitable type of pump or the like may be utilized for driving the water through the sprayer 22. Preferably, a drain pan 50 is positioned beneath the sprayer 22 for collecting excess water sprayed therefrom, and the drain pan 50 is preferably in fluid communication with the water reservoir 24 for recycling of the excess water. In addition to dampening of the pad 20, the sprayer 22 also preferably produces an atomized spray within the upper portion 16 to provide humidity to the first portion of the environmental air EA1, thus providing additional cooling to the air EA1 before it is further cooled by evaporative cooling in the pad 20.

A sensible heat exchanger 26 is mounted in the upper portion 16 of the housing 12 above the evaporator pad 20. The sensible heat exchanger 26 is in communication with the water reservoir 24 for receiving water therefrom. The water received by, and which passes through, the sensible heat exchanger 26 is cooled by the first cooled air stream CA1 via heat exchange therewith to cool the volume of water W in the water reservoir 24, i.e., the sensible heat exchanger 26 receives water from the water reservoir 24 and via heat exchange with the first cooled air stream CA1, cools the water and then returns the cooled water to the water reservoir 24. As shown, a conventional pump 30 or the like selectively drives the water from the water reservoir 24 through the sensible heat exchanger 26, and back to the water reservoir 24.

A condenser fan 28 is mounted on the housing 12 adjacent to the upper vent 52. The condenser fan 28 draws the first portion of the environmental air EA1 through the evaporator pad 20, as well as drawing the first cooled air stream CA1 across the sensible heat exchanger 26, producing a heated exhaust stream EX, which is then further drawn out of the housing 12 through the upper vent 52. Additionally, as shown, a makeup water port may be formed through the central portion 18 of the housing 12 for selectively adding makeup water to the water reservoir 24. Similarly, a drains 42 and 42' may be formed through the central portion 18 of the housing 12 for selectively draining the water reservoir 24.

A condenser 36 is disposed within the water reservoir 24, and a compressor 34 is disposed within the lower portion 200 of the housing 12. An evaporator 38 is also disposed within the lower portion 200 of the housing 12. The condenser 36, the compressor 34 and the evaporator 38 may be any suitable type of condenser, compressor and evaporator that is well known in the field of refrigeration and cooling. The condenser 36, compressor 34 and evaporator 38 are each in fluid communication with one another, forming a conventional evaporator-condenser cooling cycle, but with the condenser 36 being immersed in the water reservoir 24. An additional expansion valve 44 may also be connected between the output of the condenser 36 and the input of the evaporator 38, as is conventionally known.

As in a conventional refrigeration or cooling cycle, gaseous refrigerant is output from the evaporator 38, and is then compressed to pressurized refrigerant by the compressor 34. The pressurized refrigerant is then input to the condenser 36 for condensation thereof into liquid refrigerant. The liquid refrigerant is then input back into the evaporator 38, where it evaporates, producing the gaseous refrigerant. In the present system 10, the cooling and condensation of the refrigerant in the condenser 36 is enhanced by the cool water W contained within the water reservoir 24, which is produced by the sensible heat exchanger 26.

Heat exchange between the evaporator 38 and the second portion of the environmental air EA2 produces the gaseous refrigerant that is output from the evaporator 38 and further cools the second portion of the environmental air EA2 to produce a second cooled air stream CA2. The second cooled air stream CA2' exits the lower portion 200 of the housing 12 through the lower vent 32 formed therethrough. This second cooled air stream CA2 is the desired cooled air product. An evaporator fan 40 is mounted in the lower portion of the housing 12 adjacent the lower vent 32 for driving the second portion of the environmental air EA2 across the evaporator 38 for heat exchange therewith, and for further driving the second cooled air stream CA2 through the lower vent 32.

The sensible heat exchanger 26 produces water, which is cooled to a temperature beneath the condensation point of the refrigerant fluid. As opposed to a typical air-cooled condenser, which rejects heat from the refrigerant to the air at the ambient dry bulb temperature, the condenser 36 rejects heat from the refrigerant to water W, which can exist at the wet bulb temperature of the ambient air (typically between 10° C. and 20° C. lower than the dry bulb temperature). This lower temperature of condensation allows the condenser 36 to reject more heat than a conventional air-cooled condenser, resulting in less work (i.e., energy expenditure) for the compressor 34. Thus, the system 10 is between 20% and 40% more energy efficient than a comparable air-cooled condenser.

For purposes of comparison against a conventional, air-cooled condenser air conditioning system, the following typical exemplary system parameters for system 10 are considered: an initial water temperature of 35° C.; a dry bulb temperature of environmental air EA1 entering evaporation pad 20 of 48° C.; a wet bulb temperature of environmental air EA1 entering evaporation pad 20 of 24.4° C.; a condensing temperature of 32° C.; an external static pressure for evaporator fan 40 of 200 Pa; an air flow through sensible heat exchanger 26 of 1000 L/S; a dry bulb entering evaporation temperature of 25° C., a wet bulb entering evaporation temperature of 16.6° C.; a total air flow of 1500 L/S; an environmental air (EA) flow of 150 L/S; an evaporator pad 20 efficiency of 97%; a temperature of cooled air CA1 leaving evaporator pad 20 of 25 C.; a temperature of water leaving sensible heat exchanger 26 of 30°; heat rejection of 26.4 KW; a cooling capacity of 6 TR (21 KW); a dry bulb exit temperature for condenser 36 of 13° C.; and a wet bulb exit temperature for condenser 36 of 11° C.

For purposes of comparison, the coefficient of performance (COP) is calculated as the ratio of cooling provided to work required. With regard to work required for a conventional air conditioning or refrigeration system, the work required is the energy required to operate the compressor, fans and pumps. For a conventional, air-cooled condenser air conditioning system with a work required of 11.2 KW, the cooling effect is typically approximately 21.63 KW, yielding a COP of 1.93. For the present system 10, though, which makes use of the evaporative sub-system combined with the sensible heat exchanger 26 to provide cooling for the water-immersed condenser 36, the work required is only 5.06 KW for an equivalent cooling effect of 21.63 KW, yielding a COP of 4.27 for the present system 10.

It is to be understood that the present invention is not limited to the embodiments described above, but encompasses any and all embodiments within the scope of the following claims.

We claim:

1. An evaporative condenser cooling system, comprising:
a housing having an upper portion, a lower portion and a central portion, and at least one air inlet formed through the housing for receiving environmental air, including a first portion of the environmental air passing into the upper portion of the housing and a second portion of the environmental air passing into the lower portion of the housing;
a water reservoir disposed within the central portion of the housing for storing a volume of water;
a sprayer mounted in the upper portion of the housing;
an evaporator pad mounted in the upper portion of the housing, the sprayer being embedded therein, the sprayer being in communication with the water reservoir for spraying water into the evaporator pad, the first portion of the environmental air being drawn through the evaporator pad to produce a first cooled air stream by evaporative cooling;
a sensible heat exchanger mounted in the upper portion of the housing above the evaporator pad, the sensible heat exchanger being in communication with the water reservoir for receiving water therefrom, the water received by the sensible heat exchanger being cooled by the first cooled air stream to cool the volume of water in the water reservoir;
a condenser disposed within the water reservoir;
a compressor disposed within the lower portion of the housing, the compressor being in fluid communication with the condenser; and
an evaporator disposed within the lower portion of the housing, the evaporator being in fluid communication with the condenser and the compressor such that gaseous refrigerant output from the evaporator is compressed to pressurized refrigerant by the compressor, the pressurized refrigerant being input to the condenser for condensing thereof to liquid refrigerant, the liquid refrigerant being input to the evaporator,
wherein heat exchange between the evaporator and the second portion of the environmental air produces the gaseous refrigerant that is output from the evaporator and further cools the second portion of the environmental air to produce a second cooled air stream, the second cooled air stream exiting the lower portion of the housing through a lower vent formed therein.

2. The evaporative condenser cooling system as recited in claim 1, wherein the upper portion of said housing has an upper vent formed therein, said sensible heat exchanger exchanging heat energy between the water received therein and the first cooled air stream to produce a heated exhaust stream, the heated exhaust stream being expelled through the upper vent.

3. The evaporative condenser cooling system as recited in claim 2, further comprising a condenser fan mounted on said housing adjacent to the upper vent, the condenser fan drawing the first portion of the environmental air through said evaporator pad, drawing the first cooled air stream across the sensible heat exchanger and drawing the heated exhaust stream out of said housing.

4. The evaporative condenser cooling system as recited in claim 1, further comprising a pump connected to said water reservoir and said sensible heat exchanger for driving the water from said water reservoir and through said sensible heat exchanger.

5. The evaporative condenser cooling system as recited in claim 4, further comprising an evaporator fan mounted in the lower portion of said housing adjacent the lower vent for driving the second portion of the environmental air across the evaporator for heat exchange therewith, and further driving the second cooled air stream through the lower vent.

6. The evaporative condenser cooling system as recited in claim 1, further comprising a makeup water port formed through the central portion of said housing for selectively adding makeup water to said water reservoir.

7. The evaporative condenser cooling system as recited in claim 6, further comprising a drain disposed in the central portion of said housing for selectively draining said water reservoir.

8. The evaporative condenser cooling system as recited in claim 1, further comprising an expansion valve in fluid communication between said condenser and said evaporator.

9. The evaporative condenser cooling system as recited in claim 1, further comprising a drain pan positioned beneath said sprayer for collecting excess water sprayed therefrom.

* * * * *